(12) United States Patent
Negishi et al.

(10) Patent No.: US 10,522,812 B2
(45) Date of Patent: *Dec. 31, 2019

(54) BATTERY AND BATTERY MODULE

(71) Applicants: KABUSHIKI KAISHA TOSHIBA, Minato-ku (JP); Toshiba Infrastructure Systems & Solutions Corporation, Kawasaki-shi (JP)

(72) Inventors: Nobuyasu Negishi, Kashiwazaki (JP); Tatsuya Hashimoto, Kashiwazaki (JP); Naoki Iwamura, Kashiwazaki (JP); Tatsuya Shinoda, Kashiwazaki (JP); Koichi Takeshita, Kashiwazaki (JP); Yasuaki Murashi, Kashiwazaki (JP)

(73) Assignees: KABUSHIKI KAISHA TOSHIBA, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 62 days.

This patent is subject to a terminal disclaimer.

(21) Appl. No.: 15/835,521

(22) Filed: Dec. 8, 2017

(65) Prior Publication Data

US 2018/0102528 A1    Apr. 12, 2018

Related U.S. Application Data

(63) Continuation of application No. PCT/JP2016/067577, filed on Jun. 13, 2016.

(30) Foreign Application Priority Data

Jun. 12, 2015   (JP) ................................ 2015-119495

(51) Int. Cl.
*H01M 2/30* (2006.01)
*H01M 2/02* (2006.01)
(Continued)

(52) U.S. Cl.
CPC ............... *H01M 2/30* (2013.01); *H01M 2/02* (2013.01); *H01M 2/06* (2013.01); *H01M 2/10* (2013.01); *H01M 2/20* (2013.01); *H01M 2/202* (2013.01)

(58) Field of Classification Search
CPC ............ H01M 2/02; H01M 2/06; H01M 2/10; H01M 2/20; H01M 2/202
See application file for complete search history.

(56) References Cited

U.S. PATENT DOCUMENTS

| | | |
|---|---|---|
| 2004/0180260 A1 | 9/2004 | Somatomo et al. |
| 2005/0095502 A1 | 5/2005 | Sugimune et al. |
| 2011/0129711 A1 | 6/2011 | Ahn et al. |

FOREIGN PATENT DOCUMENTS

| | | |
|---|---|---|
| EP | 3 101 710 A1 | 12/2016 |
| JP | 11-031486 | 2/1999 |

(Continued)

OTHER PUBLICATIONS

Yoshioka, Masanobu, WO 2015083758, English Google Translation (Year: 2015).*

(Continued)

*Primary Examiner* — Jimmy Vo
(74) *Attorney, Agent, or Firm* — Oblon, McClelland, Maier & Neustadt, L.L.P.

(57) ABSTRACT

According to one embodiment, a battery is provided. The battery includes an electrode body, a lead, a container member, and a terminal. The container member includes a main part and a terminal-connecting part adjacent to the main part. The electrode body is housed in the main part of the container member. The lead is electrically connected to the electrode body. The lead is housed in the terminal-connecting part of the container member. The terminal is electrically connected to the lead. The terminal is provided on the terminal-connecting part. A thickness of the main part (Continued)

of the container member is larger than a thickness of the terminal-connecting part of the container member.

5 Claims, 8 Drawing Sheets

(51) Int. Cl.
*H01M 2/06* (2006.01)
*H01M 2/10* (2006.01)
*H01M 2/20* (2006.01)

(56) References Cited

FOREIGN PATENT DOCUMENTS

| JP | 2001-250517 | 9/2001 |
|---|---|---|
| JP | 2003-142043 | 5/2003 |
| JP | 2004-103369 | 4/2004 |
| JP | 2005-129488 | 5/2005 |
| JP | 2010-073342 | 4/2010 |
| JP | 2011-119214 | 6/2011 |
| JP | 2013-041788 | 2/2013 |
| WO | WO 2015/083758 A1 | 6/2015 |
| WO | WO 2015/115557 A1 | 8/2015 |

OTHER PUBLICATIONS

International Search Report dated Sep. 13, 2016 in PCT/JP2016/067577 filed Jun. 13, 2016 (with English Translation).
Written Opinion dated Sep. 13, 2016 in PCT/JP2016/067577 filed Jun. 13, 2016.

* cited by examiner

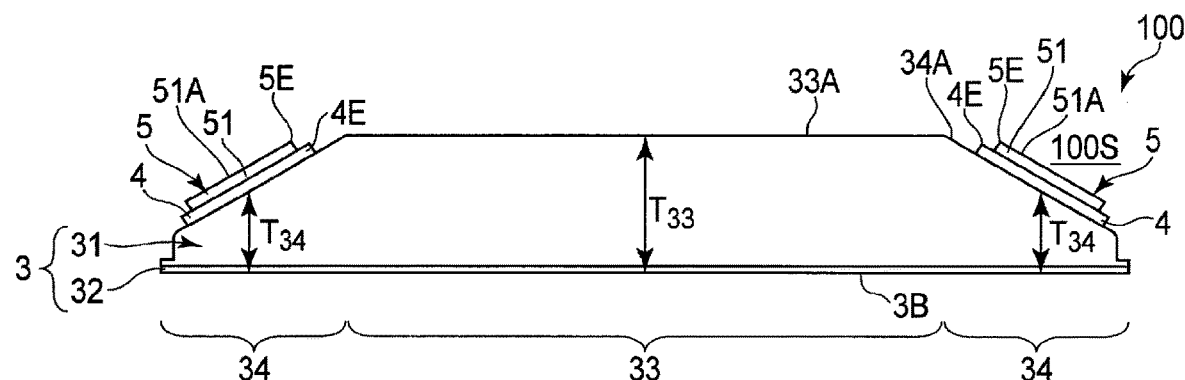
F I G. 7
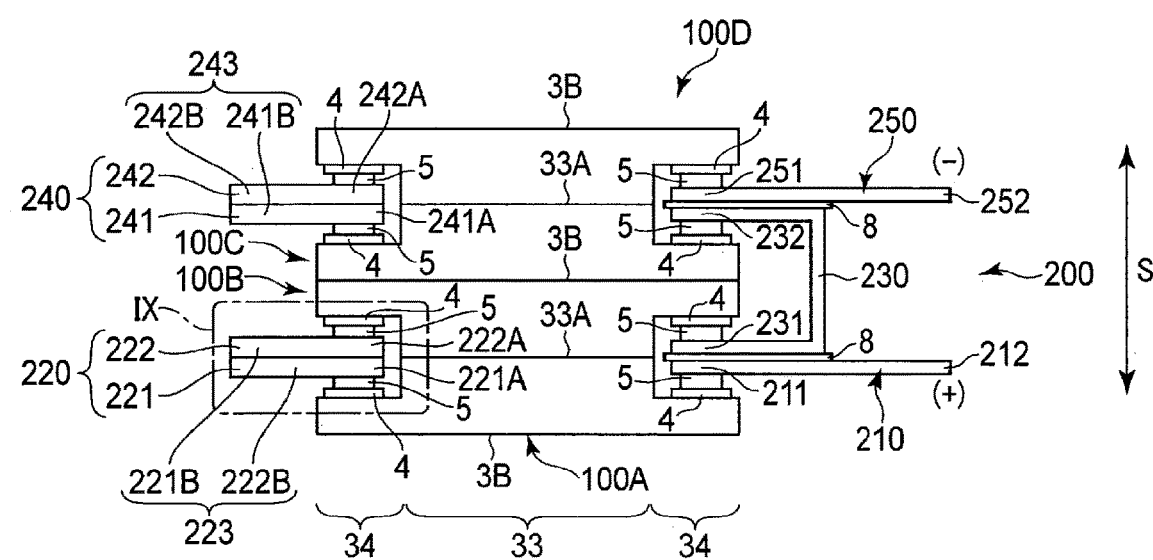
F I G. 8

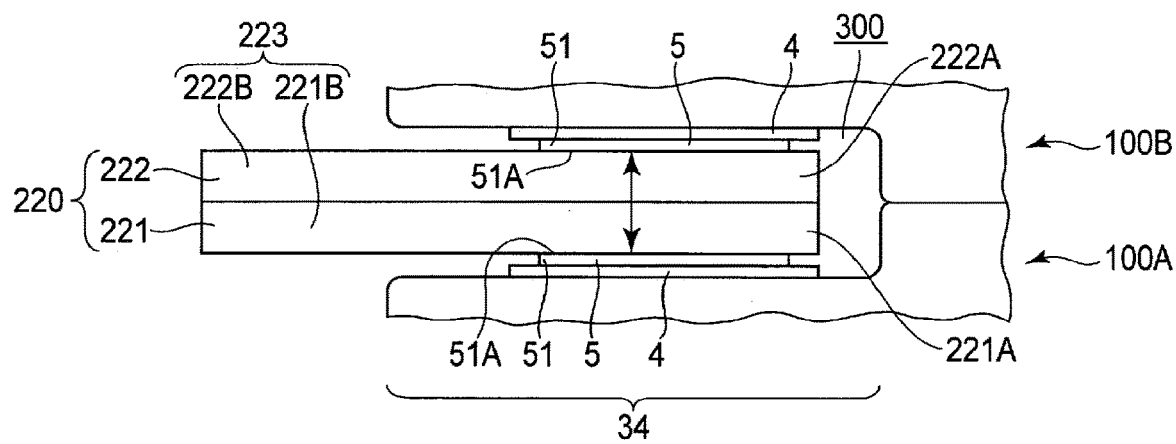
F I G. 9
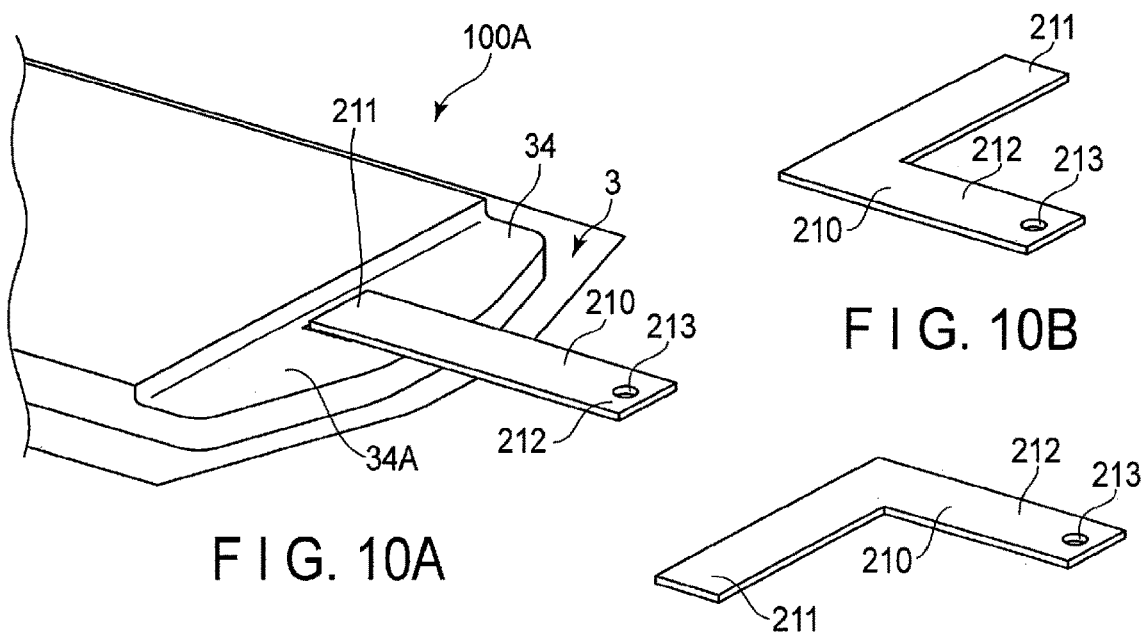
F I G. 10A
F I G. 10B
F I G. 10C

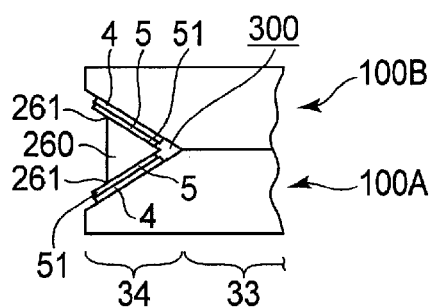
F I G. 11A
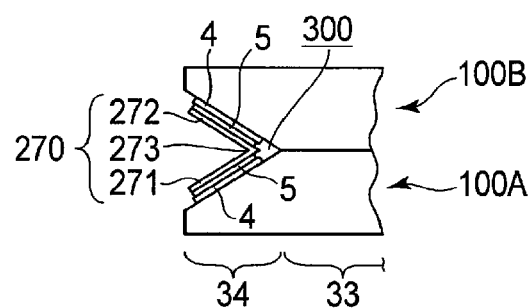
F I G. 11B
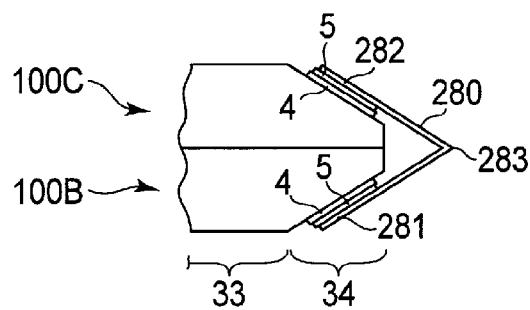
F I G. 11C
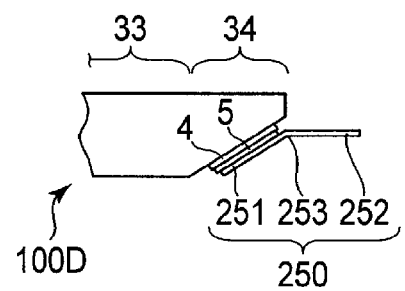
F I G. 11D

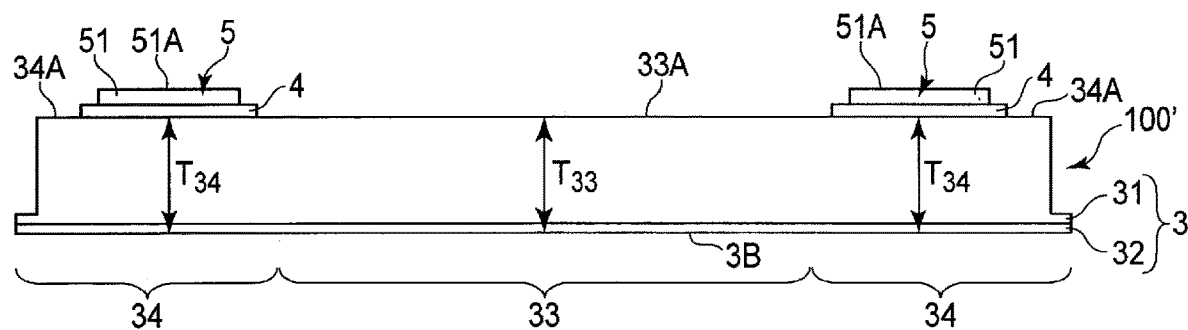
F I G. 12
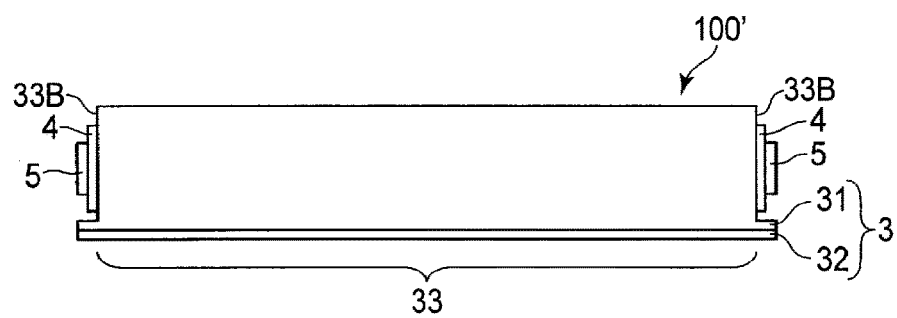
F I G. 13

BATTERY AND BATTERY MODULE

CROSS-REFERENCE TO RELATED APPLICATIONS

This application is a Continuation Application of PCT Application No. PCT/JP2016/067577, filed Jun. 13, 2016 and based upon and claiming the benefit of priority from the Japanese Patent Application No. 2015-119495, filed Jun. 12, 2015, the entire contents of all of which are incorporated herein by reference.

FIELD

Embodiments described herein relate to a battery and a battery module.

BACKGROUND

In a thin laminate type battery, for example, a terminal is sandwiched between two films or plates, and a part of the terminal is exposed. A thin can-type battery includes, for example, a terminal including a portion extending from a side surface to be exposed to the outside. The battery can provide power distribution to other batteries or electronic devices via the exposed portion of the terminal.

In the case where the allowable current of the battery is larger, the area of the exposed part of the terminal is desirably larger from the viewpoint of the resistance of the battery.

BRIEF DESCRIPTION OF THE DRAWINGS

FIG. 7 is a schematic side view of a battery as a second example according to the first embodiment;

FIG. 8 is a schematic plan view of a battery module as a first example according to a second embodiment;

FIG. 9 is an enlarged view of a portion IX in FIG. 8;

FIG. 10A is a perspective view of an example of a bus bar which can be included in the battery module according to the second embodiment;

FIG. 10B is a perspective view of an example of a bus bar which can be included in the battery module according to the second embodiment;

FIG. 10C is a perspective view of an example of a bus bar which can be included in the battery module according to the second embodiment;

FIG. 11A is an enlarged plan view of a connection point between a bus bar and a battery in a battery module as a second example according to the second embodiment;

FIG. 11B is an enlarged plan view of a connection point between a bus bar and a battery in a battery module as a second example according to the second embodiment;

FIG. 11C is an enlarged plan view of a connection point between a bus bar and a battery in a battery module as a second example according to the second embodiment;

FIG. 11D is an enlarged plan view of a connection point between a bus bar and a battery in a battery module as a second example according to the second embodiment;

FIG. 12 is a side view of a battery of Comparative Example 1; and

FIG. 13 is a side view of a battery of Comparative Example 2.

DETAILED DESCRIPTION

Figure 1:
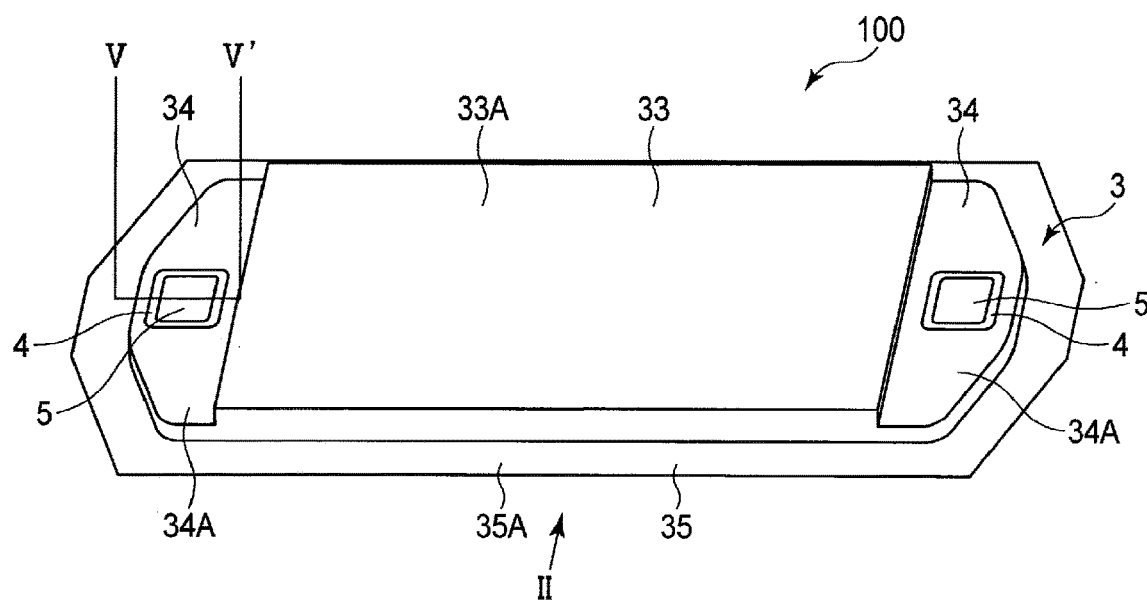
FIG. 1 is a schematic perspective view of a battery as a first example according to a first embodiment.

According to an embodiment, a battery is provided. The battery includes an electrode body, a lead, a container member, and a terminal. The container member includes a main part and a terminal-connecting part adjacent to the main part. The electrode body is housed in the main part of the container member. The lead is electrically connected to the electrode body. The lead is housed in the terminal-connecting part of the container member. The terminal is electrically connected to the lead. The terminal is provided on the terminal-connecting part of the container member. A thickness of the main part of the container member is larger than a thickness of the terminal-connecting part of the container member.

According to an embodiment, a battery module is provided. The battery module includes batteries, each of which is the battery according to the embodiment, and a bus bar. The terminal of one of the batteries is electrically connected to the terminal of another of the batteries via the bus bar.

The embodiments will be explained below with reference to the drawings. It should be noted that the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to a first embodiment, a battery is provided. The battery includes an electrode body, a lead, a container member, and a terminal. The container member includes a main part and a terminal-connecting part adjacent to the main part. The electrode body is housed in the main part of the container member. The lead is electrically connected to the electrode body. The lead is housed in the terminal-connecting part of the container member. The terminal is electrically connected to the lead. The terminal is provided on the terminal-connecting part of the container member. A thickness of the main part of the container member is larger than a thickness of the terminal-connecting part of the container member.

In the battery according to the first embodiment, the thickness of the main part of the container member is larger than the thickness of the terminal-connecting part of the container member. Therefore, in the battery according to the first embodiment, the surface of the terminal-connecting part of the container member can be positioned at a place recessed with respect to the main surface of the main part of the container member, whereby the terminal can be fitted in a place recessed with respect to the main surface of the main part of the container member.

In the battery, the terminal fitted in a place recessed from the main surface of the main part of the container member can have an exposed part having a large area for power distribution to other batteries or electronic devices. For example, in the case of a thin can type battery, the area of a side surface of a main part of a container member extending in the thickness direction of the main part is small. It is difficult for a terminal provided on the side surface of the main part of the container member to include an exposed part having a large area. The battery according to the first embodiment can include the terminal including an exposed part having a larger area, so that the battery can exhibit lower terminal resistance.

In the battery according to the first embodiment, the terminal can be fitted in a place recessed with respect to the main part of the container member, so that a power distribution member to other batteries or battery devices to be connected to the terminal, for example, a bus bar can be connected to the terminal without protruding from the main surface of the main part of the container member. Because of this, when a plurality of batteries according to the first embodiment are stacked to assemble a battery module, it is possible to prevent the bus bar from interfering with the stacking of batteries.

As described above, the battery according to the first embodiment is easily assembled into the battery module, and can exhibit low terminal resistance.

Next, the battery according to the first embodiment will be described in more detail.

The main part of the container member can include the main surface of the container member. The main surface of the container member may be a surface of the main part which does not face the electrode body. The terminal-connecting part of the container member may include a first surface and a second surface as a reverse side with respect to the first surface. The second surface of the terminal connecting part can face the lead.

The terminal may include a first end part and a second end part. The first end part can be positioned on the outside of the container member, i.e., on the side of the first surface of the terminal-connecting part. The second end part can be positioned on the inside of the container member, i.e., on the side of the second surface of the terminal-connecting part.

The terminal fitted in a place recessed from the main part of the container member can make a distance from the first surface of the terminal-connecting part of the container member to the main surface of the first end part of the terminal smaller than a distance from the first surface of the terminal-connecting part of the container member to a plane on which the main surface of the main part is positioned. The distance described herein is a distance in a direction perpendicular to the main surface of the main part of the container member. In other words, the main surface of the first end part of the terminal can be positioned between the plane where the main surface of the main part of the container member is positioned and the first surface of the terminal-connecting part.

The first surface of the terminal-connecting part of the container member may be inclined with respect to the main surface of the container member. The first surface of the terminal-connecting part of the container member when the first surface is inclined with respect to the main surface of the container member can have a larger area than that when the first surface is not inclined. Therefore, in such a battery, the exposed part of the terminal can be further enlarged, and as a result, the battery can exhibit lower terminal resistance.

The thickness of the main part of the container member is a distance from the base surface of the battery to the main surface of the container member. When the first surface of the terminal-connecting part of the container member is substantially parallel to the main surface of the container member, the thickness of the terminal-connecting part of the container member is a distance from the base surface of the battery to the first surface of the terminal-connecting part. On the other hand, when the first surface of the terminal-connecting part of the container member is inclined with respect to the main surface of the container member, the thickness of the terminal-connecting part of the container member is an average distance between the base surface of the battery to the first surface of the terminal-connecting part. The reference surface of the battery may be, for example, a bottom surface of the battery.

The battery according to the first embodiment may further include a gasket. The gasket may be provided between the terminal and the terminal-connecting part of the container member. The gasket can provide airtightness and insulation properties between the terminal and the container member.

The battery according to the first embodiment can also include members other than the members described above. For example, the battery according to the first embodiment may further include an insulating member for securing electrical insulation properties between the members, if necessary.

Next, the battery according to the first embodiment and members will be described in more detail.

(1) Battery

The battery according to the first embodiment may be a primary battery or a secondary battery. Examples of the battery according to the first embodiment include a nonaqueous electrolyte battery.

(2) Container Member

The container member may be a single member, or include two or more members.

The container member can have a space for housing the electrode body and the lead. The space for housing the electrode body and the lead can be provided by subjecting the container member to, for example, shallow drawing to form a recessed part. Alternatively, the container member is subjected to shallow drawing to form two recessed parts, and the container member is then bent to oppose the recessed parts to each other such that a larger space is formed from the spaces of the recessed parts, and thereby the space for housing the electrode body and the lead can be provided.

When the battery according to the first embodiment is the nonaqueous electrolyte battery, the container member can further include a liquid inlet for injecting an electrolytic solution, for example, a nonaqueous electrolyte, and a gas-relief vent capable of releasing the internal pressure of the battery when the internal pressure is increased to a specified value or more, or the like.

The container member is preferably made of a material having corrosion resistance. The container member can include a laminate including a metal, an alloy or a laminate of a metal and/or alloy layer and a resin layer, for example.

Examples of the metal and alloy which can form the container member include aluminum, an aluminum alloy, or stainless steel. As the aluminum alloy, an alloy containing an element such as magnesium, zinc, or silicon is preferable. If a transition metal such as iron, copper, nickel, or chromium is contained in the alloy, the content thereof is preferably set to 1% by mass or less.

As the resin layer included in the laminate product, a resin layer made of a thermoplastic resin such as polypropylene (PP) or polyethylene (PE) can be used.

(3) Electrode Body

The electrode body can include a positive electrode and a negative electrode; The positive electrode can include a positive electrode current collector, a positive electrode material layer formed thereon, and a positive electrode current-collecting tab, for example. The positive electrode current-collecting tab may be, for example, a portion of the positive electrode current collector not supporting the positive electrode material layer on its surface. Alternatively, the positive electrode current-collecting tab may be a separate part from the positive electrode current collector. The positive electrode material layer can include a positive electrode active material, a conductive agent, and a binder, for example. The negative electrode can include a negative electrode current collector, a negative electrode material layer formed thereon, and a negative electrode current-collecting tab, for example. The negative electrode current-collecting tab may be, for example, a portion of the negative electrode current collector not supporting the negative electrode material layer on its surface. Alternatively, the negative electrode current-collecting tab may be a separate part from the negative electrode current collector. The negative electrode material layer can include a negative electrode active material, a conductive agent, and a binder, for example. The positive electrode material layer and the negative electrode material layer may be provided to face each other.

The electrode body can further include a separator provided between the positive electrode material layer and negative electrode material layer that face each other.

The structure of the electrode body is not particularly limited. For example, the electrode body can have a stack structure. The stack structure has a structure in which a positive electrode and a negative electrode which are described above are stacked with a separator sandwiched therebetween. Alternatively, the electrode group can have a winding structure. The wound structure is a structure obtained by stacking a positive electrode and a negative electrode with a separator sandwiched between the positive and negative electrodes as described above and then winding the stack thus obtained in a spiral form.

(4) Lead

The lead is electrically connected to the electrode body. Particularly, the battery according to the first embodiment can include two leads. For example, a lead can be electrically connected to the positive electrode of the electrode body, and particularly the positive electrode current collector. The other lead can be electrically connected to the negative electrode of the electrode body, and particularly the negative electrode current collector.

An insulating member can be provided on the surface of the lead for the purpose of insulating the lead from the other members.

As a material for the lead, for example, an aluminum material or an aluminum alloy material can be used. The material for the lead is preferably the same as the material for the positive electrode current collector or negative electrode current collector which can electrically be connected to the lead in order to reduce contact resistance. The materials for the positive electrode current collector and the negative electrode current collector will be described later.

(5) Terminal

The terminal is electrically connected to the lead. In particular, the battery according to the first embodiment can include two terminals. For example, a terminal is a positive electrode terminal which can be connected to a lead which may be electrically connected to the positive electrode of the electrode body. The other terminal is a negative electrode terminal which can be connected to a lead which may be electrically connected to the negative electrode of the electrode body.

In the battery according to the first embodiment, the form of connection between the terminal and the lead is not particularly limited.

For example, a through hole can be further formed in a lead, and a terminal can be further fitted into the through hole, to allow connection between the terminal and the lead.

Alternatively, a through hole can be further formed in a terminal, and a projection part can be further provided on a lead. The projection part of the lead can be fitted into the through hole of the terminal to allow connection between the terminal and the lead.

The terminal and the lead may be fixed by caulking, or laser-welded.

As a material for the terminal, for example, the same material as that of the lead can be used.

(6) Gasket

Examples of a material which can form the gasket include resins such as a fluorine resin, a fluorine rubber, a polyphenylene sulfide resin (PPS resin), a polyether ether ketone resin (PEEK resin), a polypropylene resin (PP resin), and a polybutyrene terephthalate resin (PBT resin).

(7) Insulating Member

As a material for the insulating member, for example, thermoplastic resins such as a tetrafluoroethylene-perfluoroalkyl vinyl ether copolymer (PFA), polypropylene (PP), polyethylene (PE), nylon, polybutylene terephthalate (PBT), polyethylene terephthalate (PET), polytetrafluoroethylene (PTFE), polyphenylene sulfide (PPS), and polyether ether ketone (PEEK) can be used.

(8) Sandwiching Member

The battery according to the first embodiment may further include a sandwiching member for bundling a positive electrode current-collecting tab and a sandwiching member for bundling a negative electrode current-collecting tab.

The sandwiching member can be made of the same material as, for example, that of the bundled positive electrode current-collecting tab or negative electrode current-collecting tab, for example that of the positive electrode current collector or negative electrode current collector.

Hereinafter, examples of materials for the positive electrode, the negative electrode, the separator, and the electrolytic solution which can be used in the nonaqueous electrolyte battery as an example of the battery according to the first embodiment will be described in detail.

1) Positive Electrode

As the positive electrode active material, for example, an oxide or sulfide can be used. Examples of the oxide and sulfide include manganese dioxide ($MnO_2$), iron oxide, copper oxide, nickel oxide, lithium manganese composite oxides (e.g., $Li_xMn_2O_4$ or $Li_xMnO_2$), lithium nickel composite oxides (e.g., $Li_xNiO_2$), lithium cobalt composite oxides (e.g., $Li_xCoO_2$), lithium nickel cobalt composite oxides (e.g., $LiNi_{1-y}Co_yO_2$), lithium manganese cobalt composite oxides (e.g., $Li_xMn_yCo_{1-y}O_2$), lithium manganese nickel composite oxides each having a spinel-structure (e.g., $Li_xMn_{2-y}Ni_yO_4$), lithium phosphorus oxides each having a olivine structure (e.g., $Li_xFePO_4$, $Li_xFe_{1-y}Mn_yPO_4$, and $Li_xCoPO_4$), iron sulfate ($Fe_2(SO_4)_3$), vanadium oxides (e.g., $V_2O_5$), and lithium nickel cobalt manganese composite oxides, each of which absorbs lithium. In the above-described formula, $0<x\leq1$, and $0<y\leq1$. As the active material, one of these compounds may be used singly, or two or more of the compounds may be used in combination.

The binder is added to bind the active material with the current collector. Examples of the binder include polytetrafluoro ethylene (PTFE), polyvinylidene fluoride (PVdF), and a fluororubber.

The conductive agent is as necessary blended to improve the current-collection performance and to reduce the contact resistance between the active material and current collector. Examples of the conductive agent include carbonaceous materials such as acetylene black, carbon black, and graphite.

In the positive electrode material layer, the contents of the positive electrode active material and binder are preferably 80% by mass to 98% by mass, and 2% by mass to 20% by mass, respectively.

When the binder content is 2% by mass or more, sufficient electrode strength can be achieved. When the binder content is 20% by mass or less, the content of the insulator in the electrode can be reduced, and thereby the internal resistance can be decreased.

When a conductive agent is added, the contents of the positive electrode active material, binder, and conductive agent are preferably 77% by mass to 95% by mass, 2% by mass to 20% by mass, and 3% by mass to 15% by mass, respectively. When the content of the conductive agent is 3% by mass or more, the above-described effects can be achieved. By setting the amount of the conductive agent to 15% by mass or less, the decomposition of a nonaqueous electrolyte on the surface of the positive electrode conductive agent in high-temperature storage can be reduced.

The positive electrode current collector is preferably an aluminum foil or an aluminum alloy foil containing at least an element selected from Mg, Ti, Zn, Ni, Cr, Mn, Fe, Cu, and Si.

The positive electrode current-collecting tab is preferably a portion of the positive electrode current collector. However, the positive electrode current-collecting tab may be a separate part from the positive electrode current collector.

2) Negative Electrode

As the negative electrode active material, for example, metal oxides, metal nitrides, alloys, or carbon, each of which can absorb and release lithium ions, can be used. It is preferable to use a material capable of absorbing and releasing lithium ions at a potential of 0.4 V or higher (with respect to $Li/Li^+$) as the negative electrode active material.

The conductive agent is added to improve current-collection performance and to reduce the contact resistance between the negative electrode active material and the current collector. Examples of the conductive agent include carbonaceous materials such as acetylene black, carbon black, and graphite.

The binder is blended to fill gaps of the dispersed negative electrode active materials and also to bind the negative electrode active material with the current collector. Examples of the binder include polytetrafluoro ethylene (PTFE), polyvinylidene fluoride (PVdF), fluororubber, and styrene-butadiene rubber.

The contents of the active material, conductive agent and binder in the negative electrode material layer are preferably 68% by mass to 96% by mass, 2% by mass to 30% by mass, and 2% by mass to 30% by mass, respectively. When the content of the conductive agent is 2% by mass or more, the current-collection performance of the negative electrode layer can be improved. When the content of the binder is 2% by mass or more, binding property between the negative electrode material layer and the current collector is sufficiently achieved, and excellent cycling characteristics can be expected. On the other hand, the contents of the conductive agent and binder are preferably 28% by mass or less respectively, thereby increasing the capacity.

The current collector is a material which is electrochemically stable at the absorption and release potential for lithium of the negative electrode active material. The current collector is preferably made of copper, nickel, stainless steel or aluminum, or an aluminum alloy containing at least an element selected from Mg, Ti, Zn, Mn, Fe, Cu, and Si. The thickness of the current collector is preferably 5 to 20 µm. The current collector having the thickness can keep a balance between the strength and weight reduction of the negative electrode.

The negative electrode current-collecting tab is preferably a portion of the negative electrode current collector. The negative electrode current-collecting tab may be a separate part from the negative electrode current collector.

The negative electrode is produced by, for example, suspending a negative electrode active material, a binder, and a conductive agent in an ordinary solvent to prepare a slurry, applying the slurry to a current collector, drying the slurry to form a negative electrode layer, and then pressing the layer. The negative electrode may be produced by forming a negative electrode active material, a binder, and a conductive agent in pellets to produce a negative electrode layer, and providing the layer on a current collector.

3) Separator

The separator may include a porous film containing, for example, polyethylene, polypropylene, cellulose, or polyvinylidene fluoride (PVdF) or nonwoven fabric made of a synthetic resin. Among others, a porous film containing polyethylene or polypropylene can improve safety because the porous film melts at a fixed temperature to be able to shut off a current.

4) Electrolytic Solution

As the electrolytic solution, for example, a nonaqueous electrolyte can be used.

The nonaqueous electrolyte may be, for example, a liquid nonaqueous electrolyte prepared by dissolving an electrolyte in an organic solvent or a gel nonaqueous electrolyte which is a composite obtained by mixing a liquid electrolyte and a polymeric material.

The liquid nonaqueous electrolyte is preferably prepared by dissolving an electrolyte in an organic solvent in the concentration of 0.5 mol/L to 2.5 mol/L.

Examples of the electrolyte to be dissolved in an organic solvent include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and lithium bistrifluoromethylsulfonylimide [$LiN(CF_3SO_2)_2$], and mixtures thereof. The electrolyte is preferably difficult to be oxidized even at a high potential and $LiPF_6$ is most preferable.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); γ-butyrolactone (GBL), acetonitrile (AN), and sulfolane (SL). One of these organic solvents can be used alone, or a mixed solvent can be used.

Examples of the polymeric material include polyvinylidene fluoride (PVdF), polyacrylonitrile (PAN), and polyethylene oxide (PEO).

Alternatively, an ordinary-temperature molten salt (ionic melt), polymeric solid electrolyte, or inorganic solid electrolyte, each of which contains lithium ions, may be used as the nonaqueous electrolyte.

The ordinary-temperature molten salt (ionic melt) means a compound which is an organic salt containing an organic cation and an organic anion, and can exist as a liquid at normal temperature (15 to 25° C.). The ordinary-temperature molten salt includes an ordinary-temperature molten salt which exists alone as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in nonaqueous electrolyte batteries is 25° C. or lower. The organic cations generally have a quaternary ammonium skeleton.

Next, the battery according to a first embodiment will be described in more detail with reference to the drawings.

Figure 2:
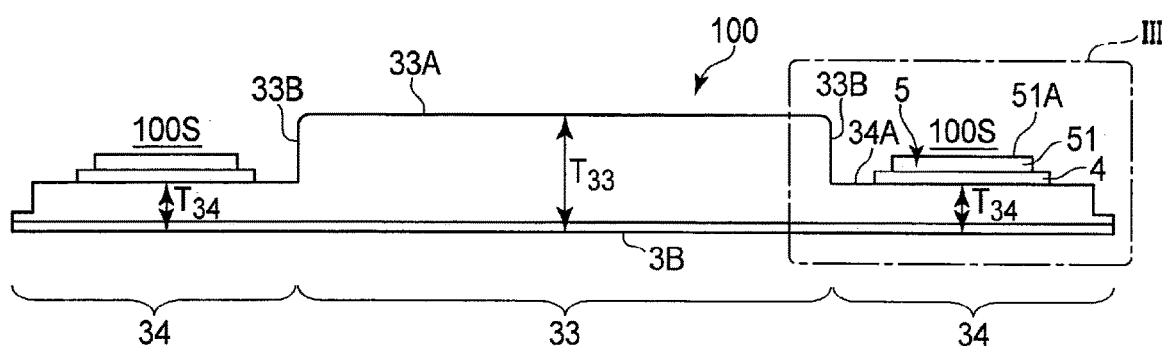
FIG. 2 is a side view of the battery of FIG. 1 as viewed from a viewpoint II.
Figure 3:
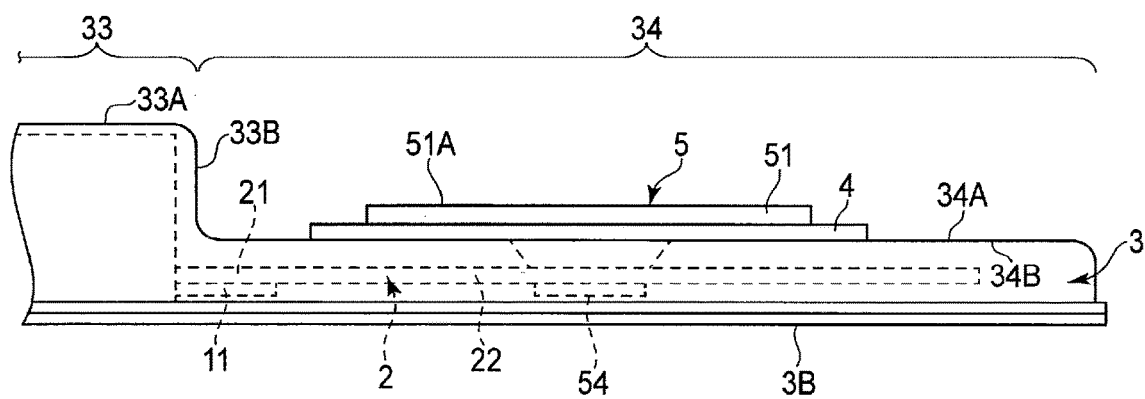
FIG. 3 is an enlarged view of a portion III of the battery of FIG. 2.

First, a battery as a first example according to the first embodiment will be described with reference to FIGS. 1 to 3. FIG. 1 is a schematic perspective view of the battery as the first example according to the first embodiment. FIG. 2 is a side view of the battery of FIG. 1 as viewed from a viewpoint II. FIG. 3 is an enlarged view of a portion III of the battery of FIG. 2.

A battery 100 shown in FIGS. 1 to 3 includes a container member 3 shown in FIGS. 1 to 3. As shown in FIGS. 1 and 2, the container member 3 includes a main part 33 and two terminal-connecting parts 34 adjacent to the main part 33.

The main part 33 of the container member 3 has a main surface 33A facing outward and having the largest area. The main surface 33A of the main part 33 of the container member 3 has a substantially rectangular shape having a pair of long sides and a pair of short sides. As shown in FIGS. 2 and 3, the main part 33 of the container member 3 further has two side surfaces 33B each of which extends from each of the two short sides of the main surface 33A and faces outward.

Each of the terminal-connecting parts 34 of the container member 3 extends from each of the two side surfaces 33B of the main part 33 of the container member 3. The terminal-connecting part 34 of the container member 3 includes a first surface 34A facing outward and a second surface 34B facing inward as a reverse surface with respect to the first surface 34A. In the container member 3, the main surface 33A of the main part 33 and the first surface 34A of the terminal-connecting part are substantially parallel.

The container member 3 has a bottom surface 3B shown in FIGS. 2 and 3. The bottom surface 3B of the container member 3 is a base surface of the battery 100.

As shown in FIG. 2, a distance from the bottom surface 3B as the base surface to the main surface 33A of the main part 33 of the container member 3, that is, the thickness $T_{33}$ of the main part 33 is larger than a distance from the bottom surface 3B to the first surface 34A of the terminal-connecting part 34 of the container member 3, that is, the thickness $T_{34}$ of the terminal-connecting part 34. That is, as shown in FIG. 2, in the battery 100, the main part 33 of the container member 3 and the two terminal-connecting parts 34 adjacent thereto form steps.

In FIG. 3, an electrode body 1 housed in the main part 33 of the container member 3 and a lead 2 housed in the terminal-connecting part 34 are indicated by broken lines. That is, as shown in FIG. 3, the battery 100 includes the electrode body 1 housed in the main part 33 of the container member 3 and the lead 2 housed in the terminal-connecting part 34.

The electrode body 1 includes a sandwiching part 11. The sandwiching part 11 will be described later in detail. The lead 2 includes an electrode-connecting part 21 and a terminal-connecting part 22. The terminal-connecting part 22 of the lead 2 faces to the second surface 34B of the terminal-connecting part 34 of the container member 3. The sandwiching part 11 of the electrode body 1 and the electrode-connecting part 21 are electrically connected, for example, by welding.

The battery 100 includes two terminals 5 shown in FIGS. 1 to 3. In FIG. 3, a portion of the terminal 5 positioned in the container member 3 is indicated by a broken line. The terminal 5 includes a first end part 51 and a second end part 54 as shown in FIG. 3. The terminal 5 is provided on the terminal-connecting part 34 of the container member 3 with a gasket 4 sandwiched between the terminal 5 and the container member 3. The first end part 51 of the terminal 5 is positioned outside the container member 3. The second end part 54 of the terminal 5 is positioned inside the container member 3. The terminal 5 is electrically connected to the terminal-connecting part 22 of the lead 2.

In the battery 100 as the first example, the thickness $T_{33}$ of the main part 33 of the container member 3 is larger than the thickness $T_{34}$ of the terminal-connecting part 34 of the container member 3, as described above. Therefore, as shown in FIGS. 2 and 3, the first end part 51 of the terminal 5 provided on the terminal-connecting part 34 of the container member 3 is positioned at a place recessed with respect to the main surface 33A of the main part 33 of the container member 3. That is, a distance from the first surface 34A of the terminal-connecting part 34 of the container member 3 to a main surface 51A of the first end part 51 of the terminal 5 is smaller than a distance from the first surface 34A of the terminal-connecting part 34 of the container member 3 to a plane on which the main surface 33A of the main part 33 of the container member 3 is positioned. The distance described herein is a distance in a direction perpendicular to the main surface 33A of the main part 33 of the container member 3.

By having the above configuration, the battery 100 as the first example 1 can include a space 100S above the first end part 51 of each of the two terminals 5 as shown in FIG. 2. The space 100S is defined by the plane on which the main surface 33A of the main part 33 of the container member 3 is positioned and the main surface 51A of the first end part 51 of the terminal 5. For example, by providing a member for power distribution to other batteries or electronic devices, for example, a bus bar in the space 100S, the bus bar can be connected to the terminal 5 without being protruded from the plane where the main surface 33A of the main part 33 of the container member 3 is positioned. Because of this, when batteries 100 of the first example are stacked to assemble a battery module, the bus bar can be prevented from interfering with stacking of the batteries 100. That is, by using the battery 100 of the first example, the battery module can be easily produced.

Also, as shown in FIGS. 2 and 3, the first surface 34A of the terminal-connecting part 34 of the container member 3 can have a larger area than that of the side surface 33B of the main part 33 of the container member 3, for example. Therefore, the terminal-connecting part 34 of the container member 3 can increase the area of the exposed part of the terminal 5, that is, the main surface 51A of the first end part 51 of the terminal 5. Thereby, the battery 100 of the first example can exhibit lower terminal resistance than that in the case where the exposed part of the terminal is provided on the side surface 33B of the main part 33 of the container member 3.

Next, the first battery 100 described with reference to FIGS. 1 to 3 will be described in more detail with further reference to FIGS. 4 to 6.

Figure 4:
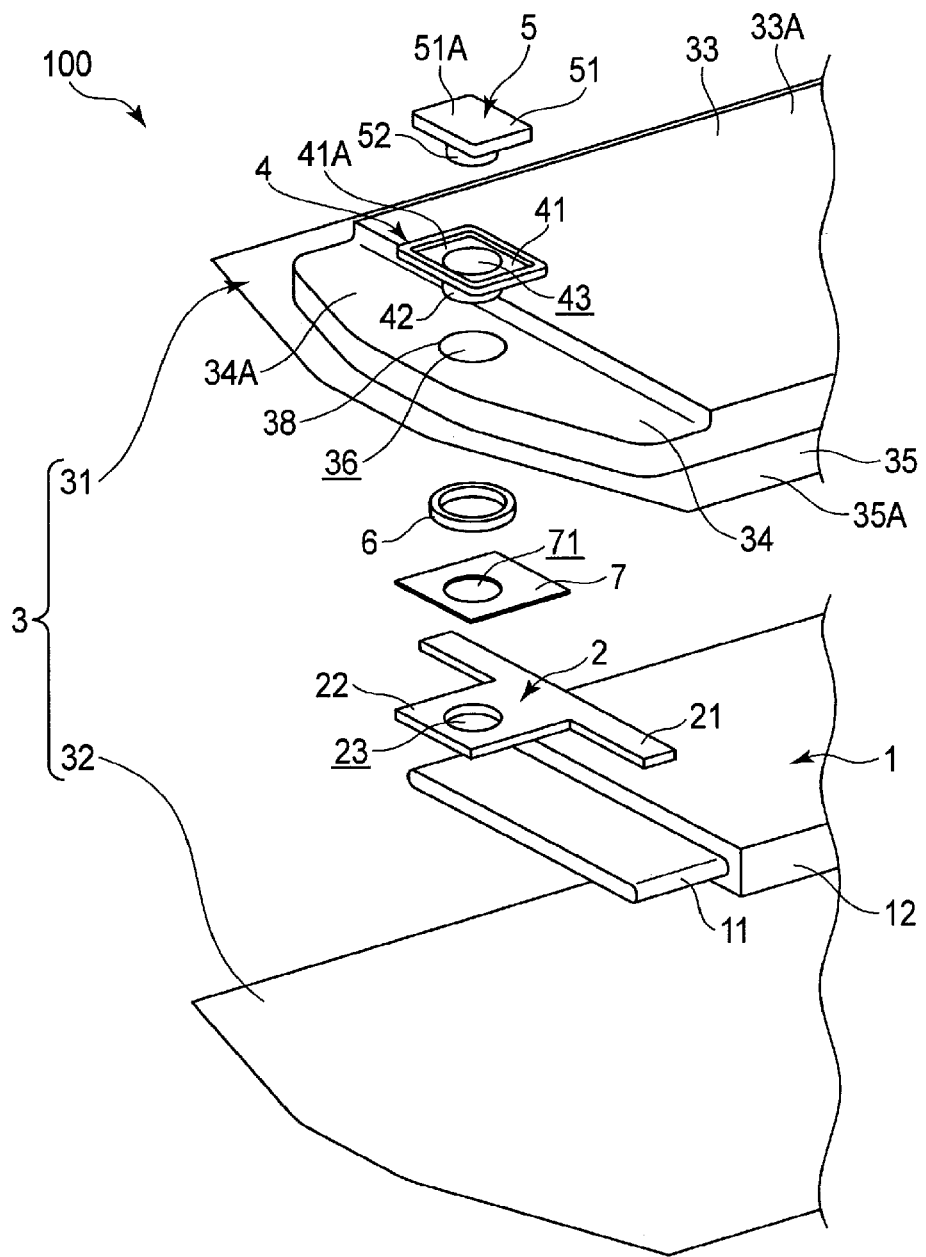
FIG. 4 is a partially exploded perspective view of the battery shown in FIGS. 1 to 3.

FIG. 4 is a partially exploded perspective view of the battery shown in FIGS. 1 to 3. FIG. 5 is a schematic cross-sectional view taken along a line segment V-V' shown in FIG. 1 of the battery shown in FIGS. 1 to 3. FIG. 6 is an enlarged sectional view of a portion VI of FIG. 5.

As shown in FIG. 4, the container member 3 included in the battery 100 of the first example includes a container body 31 and a sealing plate 32. The bottom surface 3B of the sealing plate 32 is the above-described bottom surface 3B of the container member 3.

The container body 31 includes a peripheral part 35 in addition to the main part 33 and two terminal-connecting parts 34 of the container member 3, which are described above. The peripheral part 35 forms the edge of the container body 31, and has a main surface 35A. The main surface 35A of the peripheral part 35 faces in the same direction as that of the main surface 33A of the main part 33 and that of the first surface 34A of the terminal-connecting part 34.

Figure 5:
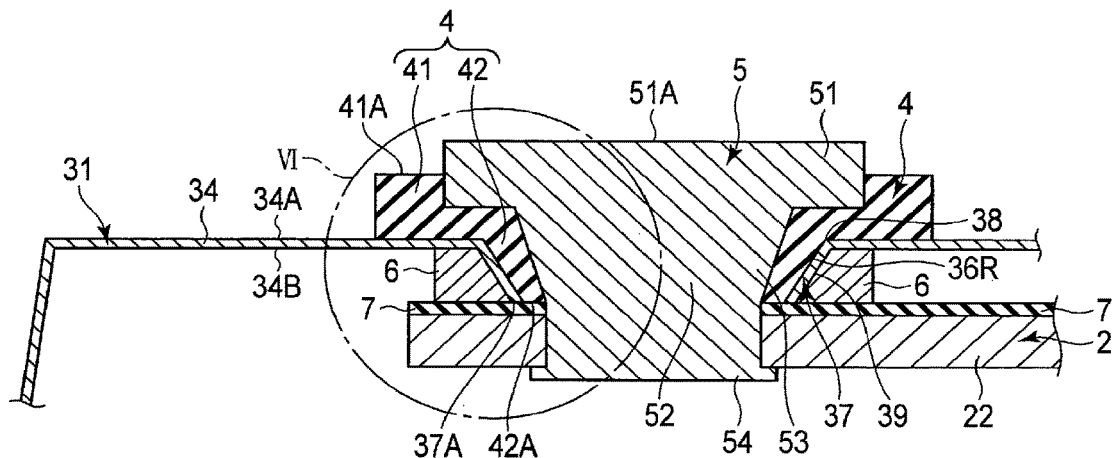
FIG. 5 is a schematic cross-sectional view taken along a line segment V-V' shown in FIG. 1 of the battery shown in FIGS. 1 to 3.
Figure 6:
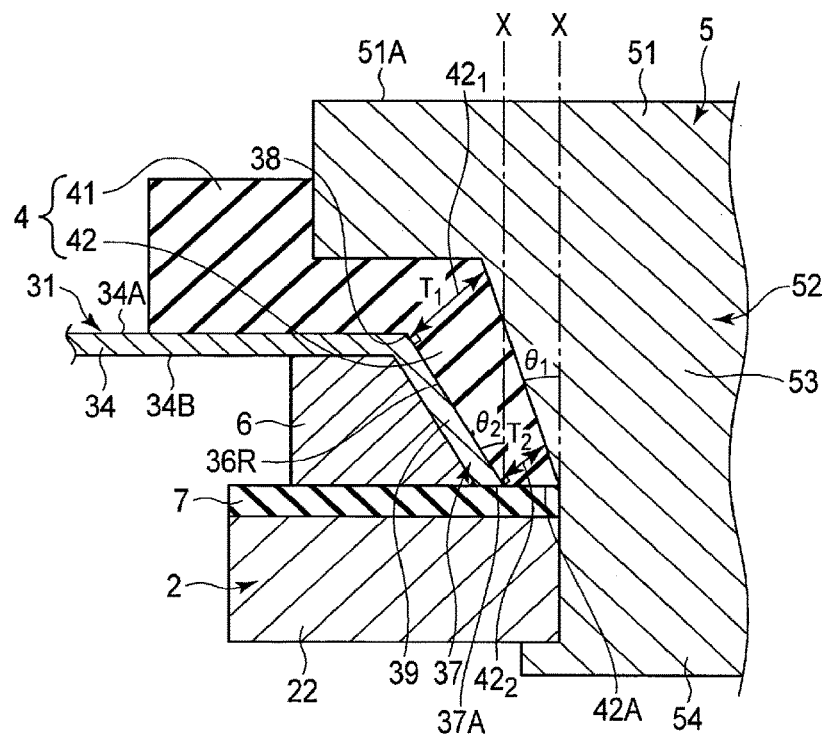
FIG. 6 is an enlarged view of a portion VI of FIG. 5.

The terminal-connecting part 34 includes a rising part 37 including a tip 37A projected from the second surface 34B, as shown in FIGS. 5 and 6. As shown in FIGS. 5 and 6, the tip 37A is positioned inside the container member 3.

As shown in FIGS. 5 and 6, the terminal-connecting part 34 further has a through hole 36 penetrating the terminal-connecting part 34 from the first surface 34A to the tip 37A of the rising part 37. The through hole 36 includes a tapered part 36R having a diameter reduced with increasing proximity to the tip 37A of the rising part 37.

The electrode body 1 housed in the main part 33 of the container member 3 includes an electrode group (not shown). The electrode group includes a belt-like positive electrode, a belt-like negative electrode, and two separators.

The positive electrode includes a positive electrode current collector and a positive electrode material layer formed on both surfaces of the positive electrode current collector. The positive electrode current collector includes a positive electrode current-collecting tab not supporting the positive electrode material layer. The positive electrode current-collecting tab extends in a direction substantially parallel to a direction in which the positive electrode extends as a belt-like shape. The negative electrode includes a negative electrode current collector and a negative electrode material layer formed on both surfaces of the negative electrode current collector. The negative electrode current collector includes a negative electrode current-collecting tab not supporting a negative electrode material layer. The negative electrode current-collecting tab extends in a direction substantially parallel to a direction in which the negative electrode extends as a belt-like shape.

The positive electrode, the negative electrode, and the separators are stacked such that the positive electrode material layer and the negative electrode material layer are opposed to each other with the separator sandwiched therebetween and the negative electrode is sandwiched between the two separators. This stacking is performed such that the positive electrode current-collecting tab and the negative electrode current-collecting tab protrude in mutually opposite directions. The stack thus obtained is wound with the negative electrode disposed inside, whereby an electrode group is formed.

The positive electrode current-collecting tab protruding from the electrode group is sandwiched by the sandwiching part 11 shown in FIG. 4. Similarly, the negative electrode current-collecting tab protruding from the electrode group is sandwiched by the same sandwiching part as the sandwiching part 11. The other portion of the electrode group is covered with an insulating tape 12 shown in FIG. 4.

As shown in FIG. 4, the lead 2 housed in the terminal-connecting part 34 of the container member 3 includes the electrode-connecting part 21 and the terminal-connecting part 22 integrated therewith. The terminal-connecting part 22 has a through hole 23. As said before, the terminal-connecting part 22 of the lead 2 faces the second surface 34B of the terminal-connecting part 34 of the container member 3. The electrode-connecting part 21 of the lead 2 is electrically connected to the sandwiching part 11 of the electrode body 1.

As shown in FIGS. 4 to 6, the gasket 4 includes a flange part 41 having a main surface 41A and a shaft 42 extending from the flange part 41. The shaft 42 is a main part of the gasket 4, and includes a tip 42A. The gasket 4 has a through hole 43 penetrating from the main surface 41A of the flange part 41 to the tip 42A of the shaft 42.

As shown in FIGS. 4 to 6, the flange part 41 of the gasket 4 is mounted on the first surface 34A of the terminal-connecting part 34 of the container member 3. On the other hand, the shaft 42 of the gasket 4 is inserted into the through hole 36 of the terminal-connecting part 34 of the container member 3. When the shaft 42 of the gasket 4 is inserted into the through hole 36 of the container member 3, the inclination of the tapered part 36R is reflected on the surface of a portion of the through hole 43 of the gasket 4 corresponding to the tapered part 36R of the through hole 36 of the terminal-connecting part 34 of the container member.

As shown in FIGS. 5 and 6, the terminal 5 includes a flange part 51 as a first end part and a caulked part 54 as a second end part. The terminal 5 further includes a main part 52 between the flange part 51 and the caulked part 54. The main part 52 extends in an axial direction X from the flange part 51 toward the caulked part 54. The main part 52 includes a diameter-reduction part 53. The diameter-reduction part 53 has a diameter that reduces with increasing proximity to the caulked part 54.

As shown in FIGS. 5 and 6, the main part 52 of the terminal 5 is inserted into the through hole 43 of the gasket 4. Thereby, a part of the shaft 42 of the gasket 4 is sandwiched between the tapered part 36R of the container member 3 and the diameter-reduction part 53 of the terminal 5.

The battery 100 further includes a restraining ring 6 and an insulating member 7 shown in FIGS. 4 to 6.

The rising part 37 of the container member 3 is inserted into the restraining ring 6. Thereby, the restraining ring 6 is positioned around the rising part 37.

As shown in FIG. 4, the insulating member is a plate-like member having a through hole 71. As shown in FIGS. 4 to 6, the tip 37A of the rising part 37 of the terminal-connecting part 34 of the container member 3 and the tip 42A of the shaft 42 of the gasket 4 are opposed to the terminal-connecting part 22 of the lead 2 via the plate-like insulating member 7. The through hole 43 of the gasket 4, the through hole 71 of the insulating member 7, and the through hole 23 of the lead 2 are in communication with each other to form a continuous hole.

The main part 52 of the terminal 5 is inserted into a through hole formed by the through hole 43 of the gasket 4, the through hole 71 of the insulating member 7, and the through hole 23 of the lead 2. A portion 54 of the terminal 5 which passes through the through hole 71 of the insulating member 7 is caulked and fixed to the insulating member 7. Thereby, the caulked part 54 is formed.

In the terminal structure shown in FIGS. 4 to 6, the inclination angle $\theta_2$ of the tapered part 36R of the container member 3 with respect to the axial direction X of the main part 52 of the terminal 5 is larger than the inclination angle $\theta_1$ of the diameter-reduction part 53 of the terminal 5 with respect to the axial direction X of the main part 52 of the terminal 5. The circumference of the rising part 37 of the terminal-connecting part 34 of the container member 3 is restrained by the restraining ring 6.

The inclination angle $\theta_2$ of the tapered part 36R is larger than the inclination angle $\theta_1$ of the diameter-reduction part 53, so that the diameter-reduction part 53 of the terminal 5 can contain a portion having a diameter larger than the diameter of the through hole 43 of the gasket 4 on which the inclination angle $\theta_2$ of the tapered part 36R is reflected, when the terminal 5 is inserted into the through hole 43 of the gasket 4. Specifically, a portion $42_2$ of the shaft 42 of the gasket 4 having a smaller diameter than the diameter of the diameter-reduction part 53 of the terminal 5 is positioned close to the tip 37A of the rising part 37. This portion $42_2$ is greatly compressed due to insertion of the main part 52 of the terminal 5. On the other hand, in a portion $42_1$ of the shaft 42 of the gasket 4 positioned close to an edge part 38 of the through hole 36 of the container member 3, the diameter of the through hole 43 is larger than the diameter of the diameter-reduction part 53 of the terminal 5, whereby the portion $42_1$ is hardly compressed. Therefore, by insertion of the terminal 5 into the through hole 43 of the gasket 4, as shown in FIG. 6, the thickness $T_1$ of the first portion $42_1$ of the shaft 42 of the gasket 4 is get larger than the thickness $T_2$ of a second portion $42_2$, where the second portion $42_2$ is close to the tip 37A of the rising part 37 of the container member 3 with respect to the first portion $42_1$.

The second portion $42_2$ of the shaft 42 of the gasket 4 is strongly compressed by the rising part 37 of the container member 3 and the diameter-reduction part 53 of the terminal 5, so that a repulsive elastic force as a counteraction thereof is applied to the rising part 37 and the diameter-reduction part 53. The circumference of the rising part 37 is restricted by the restraining ring 6, so that the repulsive elastic force generated from the second portion $42_2$ of the gasket 4 and the pressure generated from the diameter-reduction part 53 of the terminal 5 are transmitted to the restraining ring 6 through the rising part 37. The restraining ring 6 can apply the restraining force as the counteraction against the repulsive elastic force and the pressure to the gasket 4 and the terminal 5 through the rising part 37.

Because of these, the terminal structure shown in FIG. 4 to FIG. 6 can exhibit high sealing performance between the gasket 4 and the terminal 5 and between the gasket 4 and the container member 3. The shaft 42 of the gasket 4 is strongly compressed by a portion close to the tip 37A of the rising part 37 of the container member 3, so that the sizes of the infiltration path of fluid to the container member 3 and the outflow path of fluid from the container member 3 can be minimized.

Furthermore, for example, in a nonaqueous electrolyte battery including the terminal structure shown in FIGS. 4 to 6, the rising part 37 of the container member 3 is deformed such that the diameter of the through hole 36 is reduced when the internal pressure of the battery is increased, whereby the terminal 5 can be further tightened.

In the battery 100 of the first example described above, as shown in FIGS. 1 and 2, the main part 33 is sandwiched between the two terminal-connecting parts 34.

Also, one terminal 5 is electrically connected to the terminal-connecting part 22 of one lead 2. The electrode-connecting part 21 of the lead 2 is electrically connected to one sandwiching part 11. The sandwiching part 11 sandwiches the positive electrode current-collecting tab of the electrode body 1, and is electrically connected to the positive electrode current-collecting tab. Thus, one terminal 5 is electrically connected to the positive electrode of the electrode body 1. That is, one terminal 5 is a positive electrode terminal. Similarly, the other terminal 5 is electrically connected to the terminal-connecting part 22 of one lead 2. The electrode-connecting part 21 of the lead 2 is electrically connected to one sandwiching part 11. The sandwiching part 11 sandwiches the negative electrode current-collecting tab of the electrode body 1, and is electrically connected to the negative electrode current-collecting tab. Thus, one terminal 5 is electrically connected to the negative electrode of the electrode body 1. That is, one terminal 5 is a negative electrode terminal.

Therefore, in the battery 100 of the first example, the terminals 5 include the positive electrode terminal and the negative electrode terminal. The terminal-connecting part 34 of the container member 3 includes a first terminal-connecting part and a second terminal-connecting part. The first terminal-connecting part and the second terminal-connecting part are adjacent to the main-part 33 with the main part 33 of the container member 3 interposed therebetween. The positive electrode terminal is provided on the first terminal-connecting part. The negative electrode terminal is provided on the second terminal-connecting part.

Next, a battery as a second example according to the first embodiment will be described with reference to FIG. 7.

A battery 100 of the second example shown in FIG. 7 is the same as the battery 100 of the first example shown in FIGS. 1 to 6 except that a first surface 34A of a terminal-connecting part 34 of a container member 3 is inclined with respect to a main surface 33A of a main part 33 of the container member 3.

Also in the battery 100 of the second example shown in FIG. 7, the thickness $T_{33}$ of the main part 33 of the container member 3 is larger than the thickness $T_{34}$ of the terminal-connecting part 34 of the container member 3. Therefore, in the battery 100 of the second example, as shown in FIG. 7, an upper end part 4E of a gasket 4 is positioned at a place recessed from the main surface 33A of the main part 33 of the container member 3. Also, an upper end part 5E of a terminal 5 is positioned at a place recessed from the main surface 33A of the main part 33 of the container member 3. A connecting member to be connected to the terminal 5 having the upper end part 5E positioned at the place recessed from the main surface 33A of the main part 33 of the container member 3 can be fitted in a space 1005 defined by a plane on which the main surface 33A of the main part 33 of the container member 3 is positioned and a main surface 51A of a first end part 51 of the terminal 5, as shown in FIG. 7. As a result, the battery 100 of the second example can also be easily assembled into a battery module as with the battery 100 of the first example.

Furthermore, in the battery 100 of the second example, the area of the main surface 51A of the first end part 51 of the terminal 5 is larger than that of the battery 100 of the first example. Therefore, the battery 100 of the second example can exhibit lower terminal resistance than that of the battery 100 of the first example.

As described above, when the first surface 34A of the terminal-connecting part 34 of the container member 3 is inclined with respect to the main surface 33A of the main part 33 of the container member 3 as shown in FIG. 7, the thickness $T_{34}$ of the terminal-connecting part 34 of the container member 3 may be an average distance from a base surface 3B of the battery 100 to the first surface 34A of the terminal-connecting part 34.

In the battery 100 of the second example described above, as shown in FIG. 7, the main part 33 is sandwiched between the two terminal-connecting parts 34.

The battery 100 of the second example includes a positive electrode terminal and a negative electrode terminal as the terminal 5 as with the battery 100 of the first example.

Thus, in the battery 100 of the second example, the terminals 5 include the positive electrode terminal and the negative electrode terminal as with the battery 100 as the first example. The terminal-connecting part 34 of the container member 3 includes a first terminal-connecting part and a second terminal-connecting part. The first terminal-connecting part and the second terminal-connecting part are adjacent to the main part 33 with the main part 33 of the container member 3 interposed therebetween. The positive electrode terminal is provided on the first terminal-connecting part. The negative electrode terminal is provided on the second terminal-connecting part.

As described above, in the batteries 100 of the first and second examples, the positive electrode terminal and the negative electrode terminal are respectively provided in the different terminal-connecting parts 34. However, the container member of the battery according to the first embodiment may include a terminal-connecting part on which both of a positive electrode terminal and a negative electrode terminal are provided.

Next, a method for measuring the inclination angle of a diameter-reduction part of a terminal and the inclination angle of a tapered part of a container member in a battery, and a method for measuring the thickness of a gasket will be described.

First, a resin is injected into a battery, and the resin is cured. By cutting the battery having the cured inner part, the cross-section of the battery can be obtained while the positions of a container member, gasket, terminal, and restraining member are held.

The inclination angle can be confirmed from cross-sections obtained by cutting the battery in an x direction, a y direction, and a direction of 45 degrees, based on the axial direction of the terminal, for example. When the inclination angle of the tapered part of the container member is measured and the tapered part arrives at the tip of the rising part, the inclination angle at the tip of the rising part is measured. On the other hand, when the tapered part does not arrive at the tip of the rising part, the inclination angle of a portion of the tapered part close to the tip of the rising part is measured. When the angle of inclination of the diameter-reduction part of the terminal is measured and the tapered part arrives at the tip of the rising part, the inclination angle of a portion of the diameter-reduction part which sandwiches a part of the gasket together with the tip of the rising part is measured. On the other hand, when the tapered part does not arrive at the tip of the rising part, the inclination angle of a portion of the diameter-reduction part which is opposed to a portion close to the tip of the rising part in the tapered part of the rising part to sandwich a part of the gasket therebetween is measured.

The thickness of the gasket can be confirmed from the cross-section obtained by cutting the battery along the axial direction of the terminal, for example. The thickness of the gasket is measured as a thickness in a direction perpendicular to the surface of the through hole of the rising part with which the gasket is brought into contact.

In the battery according to the first embodiment, the thickness of the main part of the container member is larger than the thickness of the terminal-connecting part of the container member. Therefore, the battery according to the first embodiment can not only increase the area of the terminal provided on the terminal-connecting part, but also can fit a bus bar used for producing a battery module into a space provided by a difference in thickness between the terminal-connecting part and the main part. As a result, the battery according to the first embodiment can exhibit low terminal resistance, and can be easily assembled into a battery module.

(Second Embodiment)

According to a second embodiment, a battery module is provided. The battery module includes batteries, each of which is the battery according to the first embodiment, and a bus bar. The terminal of one of the batteries is electrically connected to the terminal of another of the batteries via the bus bar.

Hereinafter, a battery module according to a second embodiment will be described with reference to the drawings.

First, a battery module as an example according to the second embodiment will be described with reference to FIGS. 8 to 10.

FIG. 8 is a schematic perspective view of a battery module as a first example according to the second embodiment. FIG. 9 is an enlarged view of a portion IX of FIG. 8. FIGS. 10A to 10C are perspective views of several examples of bus bars which can be included in the battery module according to the second embodiment.

A battery module 200 as the first example shown in FIGS. 8 and 9 includes first to fourth batteries 100A to 100D and first to fifth bus bars 210, 220, 230, 240 and 250.

The first to fourth batteries 100A to 100D are the same as the battery 100 as the first example described with reference to FIGS. 1 to 3. A main surface 33A of a main part 33 of a container member 3 of the first battery 100A is in contact with a main surface 33A of a main part 33 of a container member 3 of the second battery 100B. A bottom surface 3B of the container member 3 of the second battery 100B is in contact with a bottom surface 3B of a container member 3 of the third battery 100C. A main surface 33A of a main part 33 of a container member 3 of the third battery 100C is in contact with a main surface 33A of a main part 33 of a container member 3 of the fourth battery 100D. Thus, as shown in FIG. 8, the first battery 100A to the fourth battery 100D are stacked in a direction S substantially perpendicular to the bottom surface 3B of each of the batteries.

The first bus bar 210 has a belt-like shape extending from a first end part 211 to a second end part 212, as shown in FIG. 10A. As shown in FIGS. 8 and 10A, the first end part 211 of the first bus bar 210 is connected to a terminal 5 provided on the terminal-connecting part 34 of the first battery 100A. This connection is made by welding. The terminal 5 is a positive electrode terminal of the first battery 100A. The second end part 212 of the first bus bar 210 includes a connection mechanism 213 for an external terminal. The connection mechanism 213 shown in FIG. 10 is a depression. However, the form of the connection mechanism 213 may be other form such as a protrusion or a through hole without particular limitation. The connection mechanism 213 can be connected to a positive electrode input terminal of an electronic device, for example.

As shown in FIGS. 8 and 9, the second bus bar 220 includes two auxiliary bus bars 221 and 222. The auxiliary bus bar 221 has a belt-like shape extending from a first end part 221A to a second end part 221B. The first end part 221A of the auxiliary bus bar 221 is connected to the terminal 5 which is a negative electrode terminal of the first battery 100A. The auxiliary bus bar 222 has a belt-like shape extending from a first end part 222A to a second end part 222B. The first end part 222A of the auxiliary bus bar 222 is connected to the terminal 5 which is a positive electrode terminal of the second battery 100B. The second end part 221B of the auxiliary bus bar 221 and the second end part 222B of the auxiliary bus bar 222 are connected to each other by welding to form a welded part 223 of the second bus bar 220.

As shown in FIG. 8, the third bus bar 230 has a U shape. The third bus bar 230 includes a first end part 231 and a second end part 232. The first end part 231 of the third bus bar 230 is connected to the terminal 5 which is a negative electrode terminal of the second battery 100B. The second end part 232 of the third bus bar 230 is connected to the terminal 5 which is a positive electrode terminal of the third battery 100C.

As shown in FIG. 8, the fourth bus bar 240 includes two auxiliary bus bars 241 and 242. The auxiliary bus bar 241 has a belt-like shape extending from a first end part 241A to a second end part 241B. The first end part 241A of the auxiliary bus bar 241 is connected to the terminal 5 which is a negative electrode terminal of the third battery 100C. The auxiliary bus bar 242 has a belt-like shape extending from a first end part 242A to a second end part 242B. The first end part 242A of the auxiliary bus bar 242 is connected to the terminal 5 which is a positive electrode terminal of the fourth battery 100D. The second end part 241B of the auxiliary bus bar 241 and the second end part 242B of the auxiliary bus bar 242 are connected to each other by welding to form a welded part 243 of the second bus bar 240.

The fifth bus bar 250 has the same structure as that of the first bus bar 210 shown in FIG. 10A, and has a belt-like shape extending from a first end part 251 to a second end part 252. As shown in FIG. 8, the first end part 251 of the fifth bus bar 250 is connected to the terminal 5 provided on the terminal-connecting part 34 of the fourth battery 100D. The terminal 5 is a negative electrode terminal of the fourth battery 100D. The second end part 252 of the fifth bus bar 250 includes a connection mechanism (not shown) for an external terminal. The connection mechanism of the fifth bus bar 250 can be connected to a negative electrode input terminal of an electronic device, for example.

As shown in FIG. 8, an insulating member 8 is inserted between the first bus bar 210 and the third bus bar 230. Similarly, the insulating member 8 is also inserted between the third bus bar 230 and the fifth bus bar 250.

By the connection described above, the first to fourth batteries 100A to 100D are connected in series via the second to fourth bus bars 220 to 240 to constitute the battery module 200. The battery module 200 includes the second end part 212 of the first bus bar 210 and the second end part 252 of the fifth bus bar 250, each of which is an external connection terminal.

As shown in FIG. 8, the first end part 211 of the first bus bar 210, the first end parts 221A and 222A of the auxiliary bus bars 221 and 222 of the second bus bar 220, the first and second end parts 231 and 232 of the third bus bar 230, the first end parts 221A and 222A of the auxiliary bus bars 241 and 242 of the fourth bus bar 240, and the first end part 251 of the fifth bus bar 250 are fitted in each of spaces 100S (see FIG. 2) provided by a difference in thickness between the main parts 3 of the container members 3 and the terminal-connecting parts 34 of the first to fourth batteries 100A to 100D. Therefore, in the battery module 200 as an example shown in FIGS. 8 and 9, the four batteries 100A to 100D can be stacked while interference from the five bus bars 210 to 250 is suppressed.

Should be noted that the first bus bar 210 shown in FIG. 10A has a belt-like shape, but as shown in FIGS. 10B and 10C, the first bus bar 210 can have a shape except than a belt-like shape. Similarly, the second bus bar 220 to the fifth bus bar 250 can have various shapes.

Furthermore, in each of the batteries 100A to 100D of the first example, as described above, the positive electrode terminal is provided on one of the two terminal-connecting parts 34 provided adjacent to the main part 33 with the main part 33 of the container member 3 sandwiched therebetween, and the negative electrode terminal is provided on the other terminal-connecting part. Therefore, in each of the batteries 100A to 100D of the first example, the positive electrode terminal and the bus bar can be connected without concern for interference from connection between the negative electrode terminal and the bus bar. Similarly, the negative electrode terminal and the bus bar can be connected without concern for interference from connection between the positive electrode terminal and the bus bar. That is, by using the batteries 100A to 100D of the first example, the battery module can be easily constructed as compared with the case of using the battery in which the positive electrode terminal and the negative electrode terminal are provided on the same terminal-connecting part of the container member.

In the battery module 200 as the first example, each of the terminals of the batteries 100A to 100D as the first example can be fitted in the space between the terminal-connecting parts 34 facing each other. Therefore, the terminals 5 of the batteries 100A to 100D of the first example are not exposed to the outside. Therefore, the battery module 200 of the first example can protect the terminals 5 of the batteries 100A to 100D of the first example from external shock or the like.

Furthermore, in the battery module 200 as the first example, as shown in FIG. 9, the thickness d of the second bus bar 220 can be set to be equal to a distance between the main surface 51A of the first end part 51 of one terminal 5 of the first battery 100A and the main surface 51A of the first end part 51 of one terminal 5 of the second battery 100B. The connection via such a second bus bar 220 allows a relative position between the first battery 100A and the second battery 100B to be maintained while securing electrical connection therebetween. Similarly, the thickness of the fourth bus bar 240 can be set to be equal to a distance between the main surface of the first end part of one terminal 5 of the third battery 100C and the main surface of the first end part of one terminal 5 of the fourth battery 100D. The connection via such a fourth bus bar 240 allows a relative position between the third battery 100C and the fourth battery 100D to be maintained while securing electrical connection therebetween.

A terminal-connecting part 34 of the second battery 100B and a terminal-connecting part 34 of the third battery 100C can be sandwiched between the first end part 231 and the second end part 232 of the U-shaped third bus bar 230. Such a third bus bar 230 can maintain a relative position between the second battery 100B and the third battery 100C while securing electrical connection therebetween.

That is, in the battery module 200 of the first example, the second bus bar, the third bus bar, and the fourth bus bar can prevent the positional deviation of each of the first to fourth batteries 100A to 100D while securing the electrical connection among the batteries. Therefore, in the battery module of the first example, a further binding member for preventing the positional deviation of each of the batteries 100A to 100D may not be used. If the further binding member is used, a load may be applied to each of the batteries. The non-use of the binding member makes it possible to prevent an unnecessary load from being applied to each of the batteries.

Of course, in the battery module according to the second embodiment, a further binding member can also be used in order to prevent the positional deviation of each of the batteries. The further binding member is not particularly limited. For example, the battery module 200 shown in FIG. 8 may further include a binding member for binding the batteries 100A to 100D in the stacking direction S thereof.

In addition, when the bus bar or the auxiliary bus bar is welded to the first end part 51 of the terminal 5, in the batteries 100A to 100D as the first example, the use of the first end part 51 of the terminal 5 protruding from the first surface 34A of the terminal-connecting part 34A as a positioning guide can facilitate positioning between the bus bar or the auxiliary bus bar and the first end part 51 of the terminal 5. In particular, the provision of a recess corresponding to the first end part 51 on the bus bar or the auxiliary bus bar can further facilitate the positioning. In addition, in each of the batteries 100A to 100D as the first example, the main surface 33A and the bottom surface 3B of the main part 33 of the container member 3 can be parallel to the first surface 34A of the two terminal-connecting parts 34 and to the main surface 51A of the first end part 51 of the terminal 5. In the batteries 100A to 100D, the contact surface between the bus bar or the auxiliary bus bar and the main surface 51A of the first end part 51 of the terminal 5 can be parallel to the main surface 33A and the bottom surface 3B of the main part 33 of the container member 3. Because of this, in each of the batteries 100A to 100D of the first example, the terminal 5 and the bus bar or the auxiliary bus bar can be more easily welded in a stable state.

Next, a battery module as a second example according to the second embodiment will be described with reference to FIGS. 11A to 11D.

Each of FIGS. 11A to 11D is an enlarged plan view of a connection point between a bus bar and a battery of the battery module as the second example according to the second embodiment.

Each of the connection points shown in FIGS. 11A, 11B, 11C, and 11D is a connection point of a battery module of an example assembled using the battery 100 as the second example according to the first embodiment described with reference to FIG. 7. FIGS. 11A and 11B correspond to a connection point between the negative electrode terminal 5 of the first battery 100A and the positive electrode terminal 5 of the second battery 100B via the second bus bar 220, as described with reference to FIGS. 8 and 9. FIG. 11C corresponds to a connection point between the negative electrode terminal 5 of the second battery 100B and the positive electrode terminal 5 of the third battery 100C via the third bus bar 230, as described with reference to FIG. 8. FIG. 11D corresponds to a connection point between the negative electrode terminal 5 of the fourth battery 100D and the fifth bus bar 250, as described with reference to FIG. 8.

In the example shown in FIG. 11A, a bus bar block 260 is used, in place of the second bus bar 220 shown in FIGS. 8 and 9. The bus bar block 260 is connected to both the negative electrode terminal 5 of the first battery 100A and the positive electrode terminal 5 of the second battery 100B at each of welding points 261 by welding.

Alternatively, as shown in FIG. 11B, it is also possible to connect the negative electrode terminal 5 of the first battery 100A and the positive electrode terminal 5 of the second battery 100E via a bus bar 270 bent in an L shape. The bus bar 270 includes a first end part 271 and a second end part 272. The bus bar 270 is bent at the place of a bent part 273. In the example shown in FIG. 11B, the first end part 271 of the bus bar 270 is welded to the negative electrode terminal 5 of the first battery 100A. The second end part 272 of the bus bar 270 is welded to the positive electrode terminal 5 of the second battery 100B.

In the example shown in FIG. 11C, connection is made by using a bus bar 280 bent in an L shape, in place of the third bus bar 230 shown in FIG. 8. The bus bar 280 includes a first end part 281 and a second end part 282. The bus bar 280 is bent at the place of a bent part 283. In the example shown in FIG. 11C, the first end part of the bus bar 280 is welded to the negative electrode terminal 5 of the second battery 100B. The second end part 282 of the bus bar 280 is welded to the positive electrode terminal 5 of the third battery 100C.

In the example shown in FIG. 11D, the fifth bus bar 250 shown in FIG. 8 is bent. The bus bar 250 is bent at the place of a bent part 253.

As with the batteries 100A to 100D as the first example, in each of the batteries 100A to 100D as the second example, a positive electrode terminal is provided on one of the two terminal-connecting parts 34 provided adjacent to the main part 33 with the main part 33 of the container member 3 sandwiched therebetween, and a negative electrode terminal is provided on the other terminal-connecting part 34. Therefore, for the same reason as in the case of using the batteries 100A to 100D as the first example, the use of the batteries 100A to 100D as the second example makes it possible to easily constitute the battery module as compared with the case of using the battery in which the positive electrode terminal and the negative electrode terminal are provided on the same terminal-connecting part of the container member.

In the battery module 200 of the second example, as shown in FIGS. 11A and 11B, for example, the bus bar block 100 or the bus bar 270 can be fitted in a space 300 between the first end part 51 of one terminal 5 of the first battery 100A and the first end part 51 of one terminal 5 of the second battery 100B. That is, the use of the batteries 100A to 100D of the second example makes it possible to prevent at least a part of the bus bar from protruding from the terminal-connecting part 34. The battery module 200 thus produced can reduce the occupied ratio of the battery module 200 to an automobile or an electronic device on which the battery module 200 is mounted, for example.

The battery module 200 of the second example including the batteries 100 of the second example allows connection among the batteries via the bus bar and/or the bus bar block after the batteries 100 are positioned. Therefore, the use of the battery 100 of the second example can facilitate the dimensional design of the battery module.

The battery module according to the second embodiment includes the battery according to the first embodiment, so that the battery module can be easily assembled, and the battery module can exhibit low terminal resistance.

EXAMPLES

The present invention will be described in more detail below with reference to examples, but the present invention is not limited to Examples shown below without deviating from the spirit of the invention.

Example 1

In Example 1, a battery unit 100 of Example 1 was produced, which had the same structure as that of a battery 100 shown in FIGS. 1 to 3 except that an electrode body 1 and a nonaqueous electrolyte were not housed.

In the battery unit 100 as Example 1, the thickness $T_{33}$ of a main part 33 of a container member 3 was 12 mm, and the thickness $T_{34}$ of a terminal-connecting part 34 of the container member 3 was 7 mm. A main surface 51A of a first end part 51 of each of two terminals 5 had an area of 120 mm². The first end part 51 (exposed portion) of each of the two terminals 5 had a height of 0.9 mm.

Example 2

In Example 2, a battery unit 100 of Example 2 was produced, which had the same structure as that of a battery 100 shown in FIG. 7 except that an electrode body 1 and a nonaqueous electrolyte were not housed.

In the battery unit 100 of Example 2, the thickness $T_{33}$ of a main part 33 of a container member 3 was 12 mm, and the thickness $T_{34}$ of a terminal-connecting part 34 of the container member 3 was 6.8 mm. A main surface 51A of a first end part 51 of each of two terminals 5 had an area of 120 mm². A portion of the first end part 51 of each of the two terminals 5 exposed from a gasket 4 had a height of 0.9 mm. A distance from an upper end part 4E of the gasket 4 to a main surface 33A of the container member 3, that is, a distance by which the gasket 4 is recessed with respect to the main surface 33A of the container member 3 was 0.9 mm. A distance by which an upper end part 5E of the terminal 5 is recessed with respect to the main surface 33A of the container member 3 was 1.0 mm.

Comparative Example 1

In Comparative Example 1, a battery unit 100' as Comparative Example 1 having a structure shown in FIG. 12 as a side view was produced. The battery unit 100' of Comparative Example 1 shown in FIG. 12 is the same as the battery unit 100 as Example 1 except that the thickness $T_{33}$ of a main part 33 in a container member 3 is the same as the thickness $T_{34}$ of a terminal-connecting part 34.

Comparative Example 2

In Comparative Example 2, a battery unit 100' as Comparative Example 2 having a structure shown in FIG. 13 as a side view was produced. The battery unit 100' as Comparative Example 2 shown in FIG. 13 is the same as the battery unit 100 as Example 1 except that a container member 3 does not include a terminal-connecting part 34, and a terminal 5 and a gasket 4 are provided on a side surface 33B of a main part 33 of the container member 3. In particular, the size of the main part 33 of the container member 3 in the battery unit 100 of Example 1 is the same as that in the battery unit 100' of Comparative Example 2.

In the battery unit 100' of Comparative Example 2, a main surface 51A of a first end part 51 of each of the two terminals 5 had an area of 120 mm². That is, in the battery unit 100' of Comparative Example 2, an exposed part of the terminal 5 had a smaller area than that of each of the battery units 100 of Examples 1 and 2.

(Assembly of Battery Module)

Using the four battery units 100 of Example 1, the battery module 200 of Example 1 having the same structure as that of the battery module 200 shown in FIG. 8 and FIG. 9 was assembled. As the first bus bar 210 and the fifth bus bar 250, a plate material having a thickness of 2 mm and made of Ni-plated pure aluminum was used. As each of the auxiliary bus bars 221 and 222 constituting the second bus bar 220, and the auxiliary bus bars 241 and 242 constituting the fourth bus bar 240, a plate material having a thickness of 2 mm and made of Ni-plated pure aluminum was used. As the third bus bar 230, a plate material having a thickness of 2 mm, made of Ni-plated pure aluminum, and being a U-shaped member was used. The battery module 200 of Example 1 could be assembled without the bus bars 210 to 250 interfering with stacking the battery units 100A to 100D.

The battery module 200 of Example 2 was assembled in the same manner as in Example 1 except that the battery unit 100 of Example 2 was used. In the battery module 200 as Example 2, a connection between the negative electrode terminal 5 of the first battery unit 100A and the positive electrode terminal 5 of the second battery unit 100B, and a connection between the negative electrode terminal 5 of the third battery unit 100C and the positive electrode terminal 5 of the fourth battery unit 100D were done as shown in FIG. 11B. In the battery module 200 of Example 2, the negative electrode terminal 5 of the second battery unit 100B and the positive electrode terminal 5 of the third battery unit 100C were connected as shown in FIG. 11C. The battery module 200 of Example 2 could be assembled without the bus bars 210 to 250 interfering with stacking of the battery units 100A to 100D.

Using the four battery units 100' as Comparative Example 1, an attempt was made to produce a battery module in the same manner as in Example 1. However, the bus bars 210 to 250 interfered with stacking of the battery units 100A' to 100D', and the battery units 100A' to 100D' could not be assembled.

[Evaluation]

Thus, the battery units 100 of each of Examples 1 and 2 could be easily assembled into the battery module 200. On the other hand, the battery units 100' of Comparative Example 1 in each of which the thickness $T_{33}$ of the main part 33 was the same as the thickness $T_{34}$ of the terminal-connecting part 34 could not be assembled into the battery module because of the interference of the bus bars.

In the battery units 100 of Examples 1 and 2, the area of the exposed part of the terminal 5 could be made larger than that of the battery unit 100' of Comparative Example 2. The size of the main part 33 of the container member 3 in each of the battery units 100 of Examples 1 and 2 is the same as that in the battery unit 100' of Comparative Example 2. As the area of the exposed part of the terminal in the batteries having the same output is larger, the terminal resistance can be lowered. Therefore, the battery 100 produced by incorporating the electrode body 1 shown in FIG. 4 in each of the battery units 100 of Examples 1 and 2 can exhibit lower terminal resistance than that of the battery produced by incorporating the same electrode body 1 into the battery unit 100' of Comparative Example 2.

The battery according to at least one of the embodiments and Examples explained above includes the container member including the main part the thickness of which is larger than the thickness of the terminal-connecting part of the container member. Therefore, in the battery, not only an area of the terminal provided on the terminal-connecting part can be increased, but also a bus bar which is used in the assembly of the battery module can be fitted in a space provided by a difference in thickness between the terminal-connecting part and the main part. As a result, the battery can exhibit low terminal resistance, and can be easily assembled into a battery module.

While certain embodiments of the present invention have been described, these embodiments have been presented by way of example only, and are not intended to limit the scope of the invention. The novel embodiments may be embodied in a variety of other forms, and various omissions, substitutions and changes may be made without departing from the spirit of the invention. The accompanying claims and their equivalents are intended to cover such forms or modifications as would fall within the scope and spirit of the invention.

What is claimed is:

1. A battery comprising:
    a container member comprising a main part and a terminal-connecting part adjacent to the main part;
    an electrode body housed in the main part;
    a lead electrically connected to the electrode body and housed in the terminal-connecting part;
    a terminal electrically connected to the lead and provided on the terminal-connecting part; and
    a gasket having a through hole,
    wherein a thickness of the main part is larger than a thickness of the terminal-connecting part,
    the main part of the container member comprises a main surface of the container member,
    the terminal-connecting part of the container member comprises a first surface and a second surface as a reverse side with respect to the first surface, and the second surface faces the lead,
    the terminal comprises a first end part and a second end part, the first end part is positioned outside the container member, and the second end part is positioned inside the container member, and
    a distance from the first surface of the terminal-connecting part of the container member to a main surface of the first end part of the terminal is smaller than a distance from the first surface to a plane on which the main surface of the container member is positioned,
    the terminal-connecting part comprises a rising part comprising a tip projected from the second surface, and a through hole passing through the terminal-connecting part from the first surface to the tip of the rising part, and the through hole comprises a tapered part having a diameter reduced with increasing proximity to the tip of the rising part,
    the terminal comprises a main part extending to an axial direction toward the second end part from the first end part, and the main part comprises a diameter-reduction part between the first end part and the second end part, and the diameter-reduction part has a diameter that reduces with increasing proximity to the second end part,
    at least a part of the gasket is located in the tapered part of the through hole of the container member,
    at least a part of the diameter-reduction part of the main part of the terminal is located in the through hole of the gasket,
    the at least a part of the gasket is sandwiched between the tapered part of the container member and the diameter-reduction part of the terminal, and
    an inclination angle of the tapered part of the container member to the axial direction of the main part of the terminal is larger than an inclination angle of the diameter-reduction part to the axial direction.

2. The battery according to claim 1, wherein the first surface of the terminal-connecting part of the container member is inclined with respect to the main surface of the container member.

3. The battery according to claim 1, wherein the container member is formed from a metal, an alloy, or a laminate of a metal and/or alloy layer and a resin layer.

4. The battery according to claim 3, wherein the container member comprises aluminum.

5. A battery module comprising:
    batteries; and
    a bus bar,
    wherein:
    each of the batteries is the battery according to claim 1; and
    the terminal of one of the batteries is electrically connected to the terminal of another of the batteries via the bus bar.

* * * * *